(12) United States Patent
Maleki (10) Patent No.: US 11,675,069 B2
(45) Date of Patent: Jun. 13, 2023

(54) DUAL LIDAR AND RADAR PHOTONIC INSTRUMENT

(71) Applicant: OEWAVES, INC., Pasadena, CA (US)

(72) Inventor: Lute Maleki, Pasadena, CA (US)

(73) Assignee: OEwaves, Inc., Pasadena, CA (US)

( * ) Notice: Subject to any disclaimer, the term of this patent is extended or adjusted under 35 U.S.C. 154(b) by 323 days.

(21) Appl. No.: 17/066,435

(22) Filed: Oct. 8, 2020

(65) Prior Publication Data

US 2022/0113398 A1 Apr. 14, 2022

(51) Int. Cl.
*G01S 13/86* (2006.01)
*G01S 7/03* (2006.01)
*G01S 7/4911* (2020.01)

(52) U.S. Cl.
CPC ........... *G01S 13/865* (2013.01); *G01S 7/032* (2013.01); *G01S 7/4911* (2013.01)

(58) Field of Classification Search
CPC ...... G01S 13/865; G01S 7/032; G01S 7/4911; G01S 7/4811; G01S 7/4917; G01S 17/32; G01S 7/35; G01S 13/34; G01S 13/42
USPC ......................................................... 342/54
See application file for complete search history.

(56) References Cited

U.S. PATENT DOCUMENTS

| | | | |
|---|---|---|---|
| 10,168,429 B2 | 1/2019 | Maleki et al. | |
| 10,686,523 B1 * | 6/2020 | Gleason | H01Q 21/065 |
| 2016/0299228 A1 * | 10/2016 | Maleki | G01S 17/89 |
| 2019/0097722 A1 * | 3/2019 | McLaurin | H01S 5/02251 |
| 2019/0146091 A1 * | 5/2019 | Matsko | H01S 5/141 356/5.01 |
| 2020/0003900 A1 * | 1/2020 | Stochino | G01S 7/4802 |
| 2020/0169249 A1 | 5/2020 | Matsko et al. | |

FOREIGN PATENT DOCUMENTS

WO  WO-2007070853 A2 *  6/2007  ............... A61B 3/00

OTHER PUBLICATIONS

F. Laghezza et al., "Integrated multi-frequency lidar / radar system for precise and robust Doppler measurements," 2015 IEEE Radar Conference (RadarCon), 2015, pp. 1109-1113, doi: 10.1109/RADAR.2015.7131160. (Year: 2015).*

* cited by examiner

*Primary Examiner* — Bernarr E Gregory
*Assistant Examiner* — Alexander L. Syrkin
(74) *Attorney, Agent, or Firm* — Loza & Loza, LLP; Daniel Mallery (57) ABSTRACT

A dual Lidar-radar sensor instrument based on a photonic implementation. The instrument employs two continuous wave lasers that concurrently provide an optical Lidar signal and a microwave radar signal, via a high bandwidth photodetector, for inherent coherence of Lidar and radar functions for data fusion and other purposes. In illustrative examples, the photonic system is integrated as a photonic integrated circuit (PIC).

25 Claims, 8 Drawing Sheets

DUAL LIDAR AND RADAR PHOTONIC INSTRUMENT

FIELD OF THE DISCLOSURE

Various aspects of the disclosure relate to photonic systems and, in particular, to a photonic system providing both Lidar (Light Detection and Ranging) and radar.

BACKGROUND

Lidar and radar are two remote sensing instruments that provide information on the distance and velocity of a target. Both are widely used in a variety of applications ranging from autonomous navigation to meteorology. Radar transmits microwave signals that are reflected by a target, and Lidar transmits optical signals to obtain distance and velocity from the reflected optical echo. In many applications, both Lidar and radar are employed to obtain both types of information. For example, in meteorology, radar provides information on rain while Lidar provides information on clouds. In autonomous navigation, Lidar, having a much higher angular resolution than radar, is useful for discerning small targets or targets that are close to each other. On the other hand, Lidar's capability can be severely diminished in bad weather, and so radar may be used to assist in those and similar situations. Lidar may be implemented using photonics, including photonic integrated circuits (PICs), and radar may be implemented by electronics technology to produce a radar frequency and to process the received echo.

SUMMARY

In one aspect, an apparatus is provided that includes: a Lidar device configured to generate a Lidar output beam from a first coherent optical beam modulated by a waveform; and a radar device configured to generate a radar output signal from a combined optical beam formed from the waveform-modulated first coherent optical beam and a second coherent optical beam, wherein a portion of the combined optical beam is modulated by a return radar signal to provide a radar-modulated optical beam.

In another aspect, a method is provided that includes: waveform-modulating a first coherent optical beam to generate a Lidar beam; combining the waveform-modulated first coherent optical beam with a second coherent optical beam to form a combined optical beam; generating a radio frequency (RF) output signal from the combined optical beam for use as a radar output signal; receiving a radar input signal in response to the radar output signal; and modulating a portion of the combined optical beam using the radar input signal to provide a modulated optical beam.

In another aspect, an apparatus is provided that includes: means for waveform-modulating a first coherent optical beam to generate a Lidar beam; means for combining the waveform-modulated first coherent optical beam with a second coherent optical beam to form a combined optical beam; means for generating an RF output signal from the combined optical beam for use as a radar output signal; means for receiving a radar input signal in response to the radar output signal; means for modulating a portion of the combined optical beam using the radar input signal to provide a modulated optical beam.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure. In the figures, elements may each have a same reference number or a different reference number to suggest that the elements represented could be different and/or similar. However, an element may be flexible enough to have different implementations and work with some or all of the systems shown or described herein. The various elements shown in the figures may be the same or different and, which one is referred to as a first element and which is called a second element is arbitrary.

Overview

In many civilian and military applications of remote sensing, the range and velocity of a distant target of interest are investigated. These applications are widely used for autonomous navigation, target detection, meteorology, metrology and alike. Often, high resolution in distance and in angular measurement are also required. Such measurements rely on the use of propagation of electromagnetic radiation, which at any frequency travels at the speed of light, as a yardstick. Since the distance of interest d is related to the time of travel t and the speed of light c through d=c/t, measurement of the time of flight of electromagnetic radiation to an object and back to the sensor provides the distance. By sensing the Doppler shift of frequency due to the motion of the target, its velocity can be discerned. If the radiation is within the RF to THz range of frequency in the electromagnetic spectrum, the sensor is referred to as radar, and if it is in the ultraviolet to infrared region of spectrum, it is referred to as Lidar.

Since the wavelength of radiation used in Lidar is much shorter than that of radar, the former is the instrument of choice where high resolution information is required. But atmospheric disturbances and water absorption limit the range of operation of Lidar, while radar is impervious to these within a wide range of frequency. As such, in many applications ranging from autonomous navigation to atmospheric studies, both modalities of Lidar and radar are required to ensure high resolution under all conditions.

Despite similarity of their functions, Lidar and radar have been developed based on distinct areas of technology. Radar has traditionally relied on electronics devices and circuits to operate, and Lidar on optical and photonics. Recent advances in photonics technology have provided the opportunity to realize the radar based on optical and photonic devices and circuits. This approach significantly reduces the complexity of radar, a welcome opportunity as the recent interest to increase the radar frequency to higher microwave bands also increases the complexity.

In this disclosure, a dual sensor is described, based on a new photonics approach, which can simultaneously or concurrently support radar and Lidar modalities. An important feature of this architecture is that it can be implemented as a photonic integrated circuit (PIC). This approach further reduces the complexity, size, weight, power consumption and cost of the dual Lidar-radar sensor.

Technical Discussions

In Lidar and radar, an important consideration is the quality and coherence of the carrier that propagates with a waveform modulated on it. While the specifics of the waveform (pulse, frequency chirp, other) can be selected based on the required performance parameters of the sensor, the coherence of the source of the carrier determines the range and allows for coherent detection of the signal. Direct detection of the signal also benefits from high coherence of the source with respect to signal to noise ratio, an important parameter governing the performance of the sensor.

In the case of Lidar, a laser provides the carrier wave and in the case of conventional radar, an RF source (RF, microwave, mm-wave, THZ) serves as the carrier frequency generator. In radar, the frequency of the carrier determines its complexity: as the carrier frequency increases, the coherence suffers. This is because the most highly coherent frequency sources, such as crystal oscillators or dielectric resonator oscillator, often referred to as "local oscillator" or LO, are typically operate at a few to a few hundreds of MHz.

Two lasers separated by a fixed frequency in their emission can beat on a photodetector to produce an electrical signal at that frequency separation. This technique has been unsuitable for high spectral purity (low noise) LO generation since the noise of the generated electrical (RF) LO is related to the noise of the two lasers through the relationship $\mathscr{L}_{RF}(f)=2\cdot\mathscr{L}_{laser}(f)$, where $\mathscr{L}(f)$ is the single sided spectral density of phase noise. Here, the worst-case scenario is considered, where the noise in the two lasers is not correlated. Note that the above relationship between the spectral purities of the two lasers and the generated RF is independent of frequency. This implies that the obtained spectral purity is fixed by the laser noise at any RF frequency (i.e., microwave, mm-wave, THz). This is a significant difference with the way electrical LO signals are generated at high frequencies, starting from a good LO at low frequencies and multiplying it up. As stated above, multiplication of the LO frequency also multiplies the noise by a factor of 20 log N, where N is the multiplication factor. By contrast, the photonic technique does not add noise as the frequency interval of the two lasers is changed to generate a higher frequency. Therefore, to generate a 100 GHz signal with phase noise $\mathscr{L}_{RF}(f)=-150$ dBc/Hz at 10 MHz, the optical signal should have phase noise user $\mathscr{L}_{laser}(f)=-153$ dBc/Hz at 10 MHz. The noise of a semiconductor laser is significantly higher than this value, and so the convenience of this technique is not accessible to high performance systems.

U.S. patent application Ser. No. 16/507,372, entitled "Arbitrary Microwave Waveform Generator using Lasers in Close Thermal and Mechanical Proximity", filed Jul. 10, 2019, U.S. patent application Ser. No. 16/152,332, entitled "Underwater Lidar", filed Oct. 4, 2018, and U.S. Provisional Patent Application 63/052,294, entitled "Photonic Processing of RF Signals using Polychromatic Coherent Optical Source" (all of which are assigned to the assignee of the present application) describe photonic schemes for generation of a highly spectrally pure LO based on two semiconductor lasers, each of which is optically injection locked to a high quality factor (Q) whispering gallery mode resonator. The result is that the lifetime of the photon in the short laser cavity is significantly extended by means of the high Q resonator, and the portion of the light fed back to the laser causes the linewidth of the laser, and thus its phase and frequency noise, to collapse by as much as six orders of magnitude, and higher. These highly spectrally pure lasers can beat on a high bandwidth photodetector and generate a spectrally pure RF output at any frequency determined by the frequency difference between the two lasers, limited only by the bandwidth of the photodetector.

A feature of this architecture is that a control circuit can be devised to tune the laser emissions, so that a tunable LO can be produced. Tuning is achieved by a combination of changing the laser temperature, the resonator temperature, and in cases where the resonator is made with material that is electrooptic, by applying a voltage to the resonator. The control circuit can also be devised to allow the lasers to be locked to a reference signal, as is typically required in applications such as receivers and radar.

See, also, U.S. Pat. No. 10,168,429 of Maleki et al., issued Jan. 1, 2019, for a "Compact LIDAR system," which disclosed a coherent Lidar architecture based on the use of one semiconductor laser. In the present disclosure, the use of two lasers allows combining the Lidar function with a radar function, in one single sensor.

Another feature of the architecture is that the radar can be wideband and agile, based on setting the frequency difference between the two lasers. Multi-band radar is important to many studies and agility allows other uses including reduction of clutter.

Exemplary Systems, Methods and Apparatus

Figure 1:
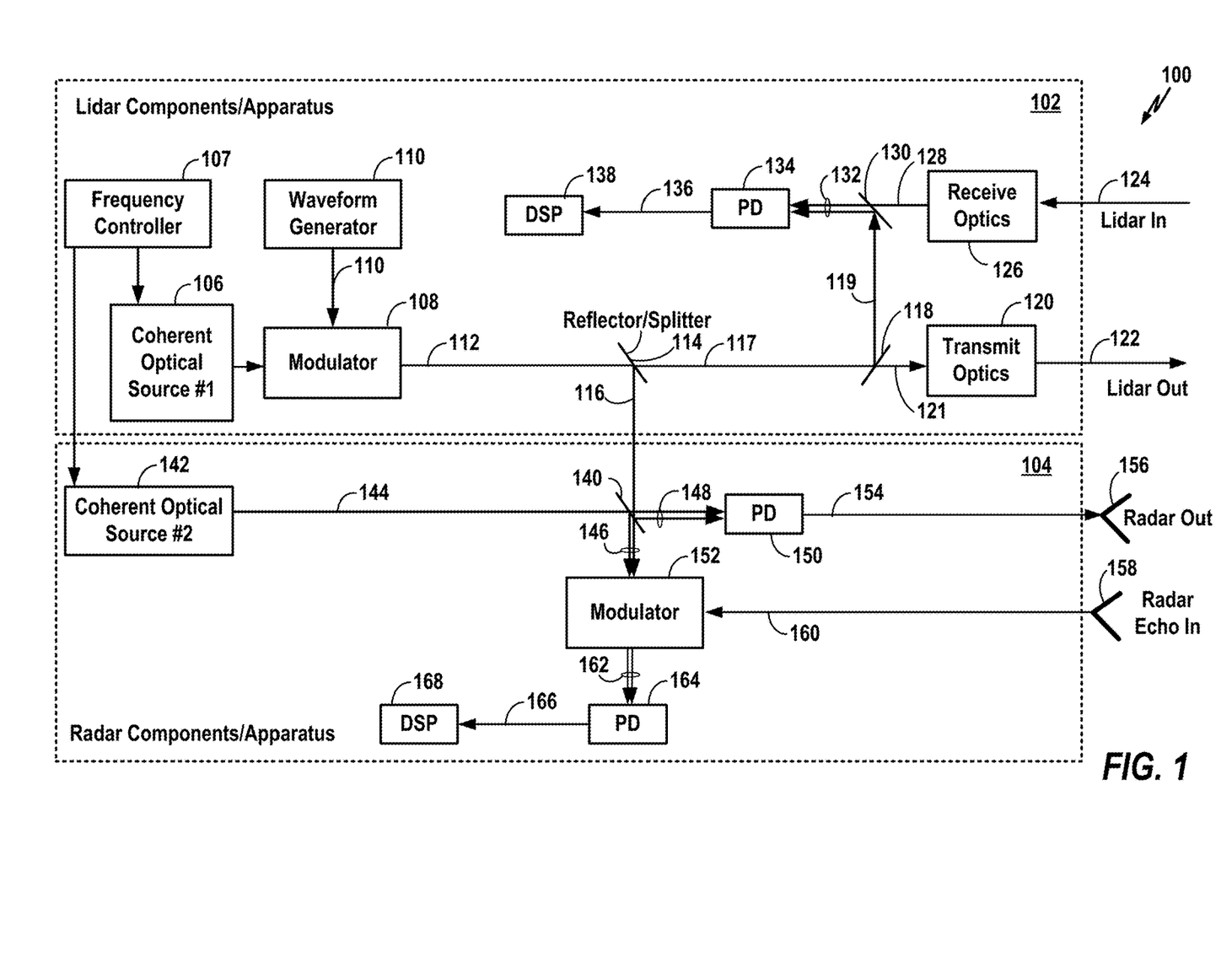
FIG. 1 is a block diagram of an exemplary dual Lidar/radar instrument.

FIG. 1 is a block diagram of a dual Lidar/radar instrument 100 wherein most of the components may be implemented as a PIC.

Briefly, in a Lidar portion 102 of the dual Lidar/radar instrument, a first coherent optical source (e.g. a first narrow linewidth continuous wave laser) is modulated with an input waveform provided by a waveform generator and introduced into transmit optics for use as a Lidar output signal. A return Lidar signal is mixed with a portion of the modulated laser beam on a low bandwidth photodetector to yield an electrical signal to be processed by a Lidar digital signal processing (DSP) system at the backend. In a radar portion 104 of the dual Lidar/radar instrument, light from a second coherent optical source (e.g. a second narrow linewidth continuous wave laser) is mixed with a portion of the modulated light from the first laser and sent to a high bandwidth photodetector (PD), which outputs the modulated waveform on a carrier set at the frequency difference between the two continuous wave lasers to be amplified and transmitted as the output of the radar. The returning radar echo is used to modulate the light comprised of the modulated light of the first laser together with light from the second laser and introduced to a low bandwidth PD to output an electrical baseband signal for use in a radar DSP. The frequency difference between the two continuous wave lasers can be controlled by a frequency controller.

Note that a feature of the system (which is comprised of a coherent radar and a coherent Lidar, using the same modulating input waveform) is that the received signals may be used coherently to enhance the received information regarding range and velocity of a target with improved resolution. If a waveform is desired for the radar portion that is different than that of the Lidar portion, an additional modulator that accepts the combined beams of the unmodulated lasers can be used, as discussed below.

Now, FIG. 1 will be described in greater detail. The Lidar apparatus or portion 100 includes a first coherent light source 106 (e.g. a spectrally pure continuous wave semiconductor laser) that generates a coherent laser beam that is fed into a first modulator 108, which is modulated by a waveform generated by a waveform generator 110 and input along a signal line 111. The waveform may be, for example, a chirp or a series of pulses, or any desired shape based on frequency and amplitude. The waveform generator 110 is shown as a component of the Lidar apparatus 102 but may be separate therefrom and, in particular, may be separate from a chip on which the other components such as the laser 106, the modulator 108, etc., are formed. The laser 106 may be a spectrally pure narrow linewidth continuous wave injection locked laser that includes a WGM resonator or other suitable resonator for locking the wavelength of the laser to a narrow linewidth decrease its noise. Other approaches such as ring resonators or any other optical resonator locked with means other than injection locking could be employed. The frequency of the first coherent light source 106 may be set or controlled by a frequency controller 107.

The wavelength-modulated output beam 112 from modulator 108 is applied to a first reflector/splitter 114, which reflects (splits) a first portion of beam 112 onto path 116 while passing a second portion of beam 112 along path 117. Note that in the functional schematic of FIG. 1, the reflector/splitter 114 is shown as an angled line. In a waveguide implementation, the component may be configured using any suitable waveguide beam splitter that splits an incoming beam into separate beams along separate waveguides. In other implementations, a half-silvered mirror could be used to reflect a portion of the incoming beam along one path while splitting another portion along a different path. In still other implementations, still others components may be used to achieve the same function. The same is true for other reflector/splitters of the drawings.

The portion of the beam along path 117 is fed to a second the reflector/splitter 118, which reflects a portion onto optical path 119 while passing a portion along path 121 into transmit optics 120, which outputs (or transmits or projects) the beam as a Lidar output beam 122 for reflecting off a remote object (not shown) of interest. A portion of beam 122 reflects off the remote object and is received as an input Lidar beam 124 (which may be described, e.g., as an echo beam or reflected beam) by receive optics 126. The transmit optics 120 and the receive optics 126 may be any suitable optical system or apparatus for, respectively, transmitting and receiving a Lidar beam, such as an assembly of steerable mirrors or lens, etc. The transmit optics 120 and the receive optics 126 may be separate off-chip components to other on-chip components of the instrument 100.

The receive optics 126 routes the received Lidar beam along a path 128 to a third reflector/splitter 130, which passes the received Lidar beam onto path 132 while also reflecting a portion of the beam along path 119 onto path 132. That is, the reflector/splitter 130 operates to merge the received Lidar beam with a portion of the modulated laser beam so that the beam along path 132 includes both the modulated laser beam and the return Lidar beam. Hence, reflector/splitter 130 may also be referred to as a beam combiner or beam merger since it combines or merges the two beams. The combined beam along path 132 is applied to a first PD 134, which generates an electrical signal along line 136 that is applied to a digital signal processing (DSP) 138, which is configured for Lidar processing. For example, Lidar DSP 138 may be configured to determine distance and velocity of the remote object via Lidar processing. As with the waveform generator 110, the Lidar DSP 138 is shown as a component of the Lidar apparatus 102 but may be a separate component formed off-chip from the other on-chip components.

As noted, a portion of the waveform-modulated beam on path 112 is split by splitter 114 onto optical path 116. The beam on path 116 is fed into the radar portion 104 of the apparatus 100, as shown, where it is applied to yet another reflector/splitter 140. A second coherent light source 142 (e.g. a second narrow linewidth semiconductor laser) generates a second coherent laser beam 144 that is also applied to reflector/splitter 140. The second coherent light source 142 may be a laser similar to the laser of the first coherent light source 106 (e.g., a spectrally pure continuous wave laser that includes a WGM resonator or other suitable resonator for locking the wavelength of the laser to the resonator to decrease its noise). The frequency of the second coherent light source 142 may be set or controlled by the frequency controller 107. The reflector/splitter 140 reflects (splits) a first portion of the second laser beam 144 onto a path 146 while passing a second portion of the beam along a path 148. Since the reflector/splitter 140 also receives the beam along path 116, it also reflects (splits) a first portion of the beam along path 116 onto path 148 while passing a second portion of the beam along path 146. That is, reflector/splitter 140 operates to combine a portion of the waveform-modulated first laser beam received along path 116 with a portion of the second laser beam received along path 144 to yield a combined beam, which is applied a high bandwidth PD 150 via path 148.

By selecting and controlling the frequencies of the first and second narrow linewidth laser beams (using frequency controller 107), the combined beam applied to the PD 150 can be caused to beat at a desired beat frequency to generate an RF tone at a desired RF frequency that is output along line 154 to generate a radar output signal via radar output components 156. The radar output components 156, which may be any suitable radar transmitter assembly, such as an RF antenna or the like, that transmits an output radar beam toward the same remote object that is scanned by the Lidar output beam 122 (or a different object, if desired). Note that reflector/splitter 140 also operates to combine a portion of the second laser beam received along path 144 with a portion of the waveform-modulated first laser beam along path 116 to yield a second combined beam that is applied to a second modulator 152 via path 146.

A radar echo input signal is received by radar input components 158 (which, in some examples, may use the same antenna as the radar out components 156). The radar echo signal is applied along a line 160 to the second modulator 152 and is used to modulate the optical signal along path 146. The radar-modulated optical beam output from modulator 152 is fed along a path 162 to a third PD 164, which generates an electrical baseband signal along line 166 for application to a radar DSP 168. For example, the radar DSP 168 may be configured to determine distance and velocity of the remote object via radar processing. The radar DSP 168 is shown as a component of the radar apparatus 104 but may be a separate component formed off-chip from the other on-chip components. Note also that the PD 164 may be a low bandwidth PD with its bandwidth selected to bandpass filter unwanted components of the beam on path 162 to yield the desired baseband signal. The operational bandwidth of the PD 164 and other components of the overall apparatus 100 may depend, of course, on the frequencies of the two lasers, the modulating waveform, and other factors such as the desired application. Those skilled in the art can determine the particular operational details for particular applications.

Figure 4:
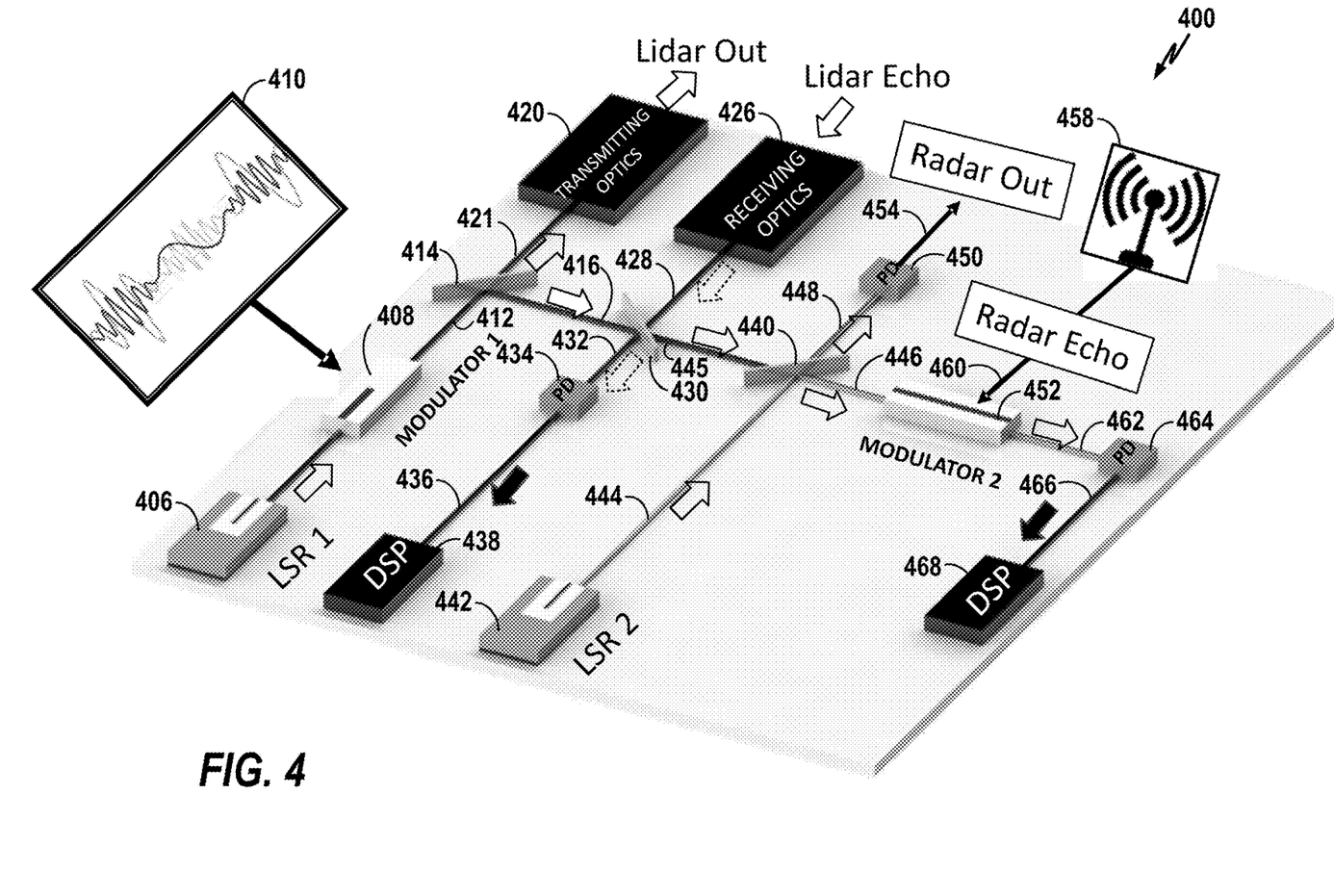
FIG. 4 illustrates an exemplary chip configuration for a dual Lidar/radar instrument.

The architecture depicted in FIG. 1 (and in other figures discussed below) can be directly transferred to and implemented using a PIC. The waveguides, beam splitters, and other passive components can be fabricated with silicon or silicon nitride, or other material compatible with semiconductor manufacturing processes. The lasers and detectors can be flip chipped, as can be the resonators (discussed below) or can be heterogeneously manufactured on the same chip. Alternatively, the resonators may be manufactured as high Q ring or optical grating resonators. The modulator can be of Mach-Zehnder type or ring or plasmonic variety, also manufacturable via semiconductor manufacturing processes. Examples of photonic LO architectures are depicted in FIG. 4 (discussed below). Other components can be similarly assembled to obtain a full system on a PIC. In other embodiments, any or all of the components may be separate components coupled together using, e.g., fiber optics or electrical connection lines (depending upon whether optical beams or electrical signals are being connected).

As noted, coherent light sources 106 and 142 of FIG. 1 each may include a spectrally pure continuous wave laser that includes a WGM resonator or other suitable resonator. Details regarding examples of such coherent light sources are provided in the patent documents listed above. For the sake of completeness, a brief summary of the principal components of such coherent light sources will now be provided.

Figure 2:
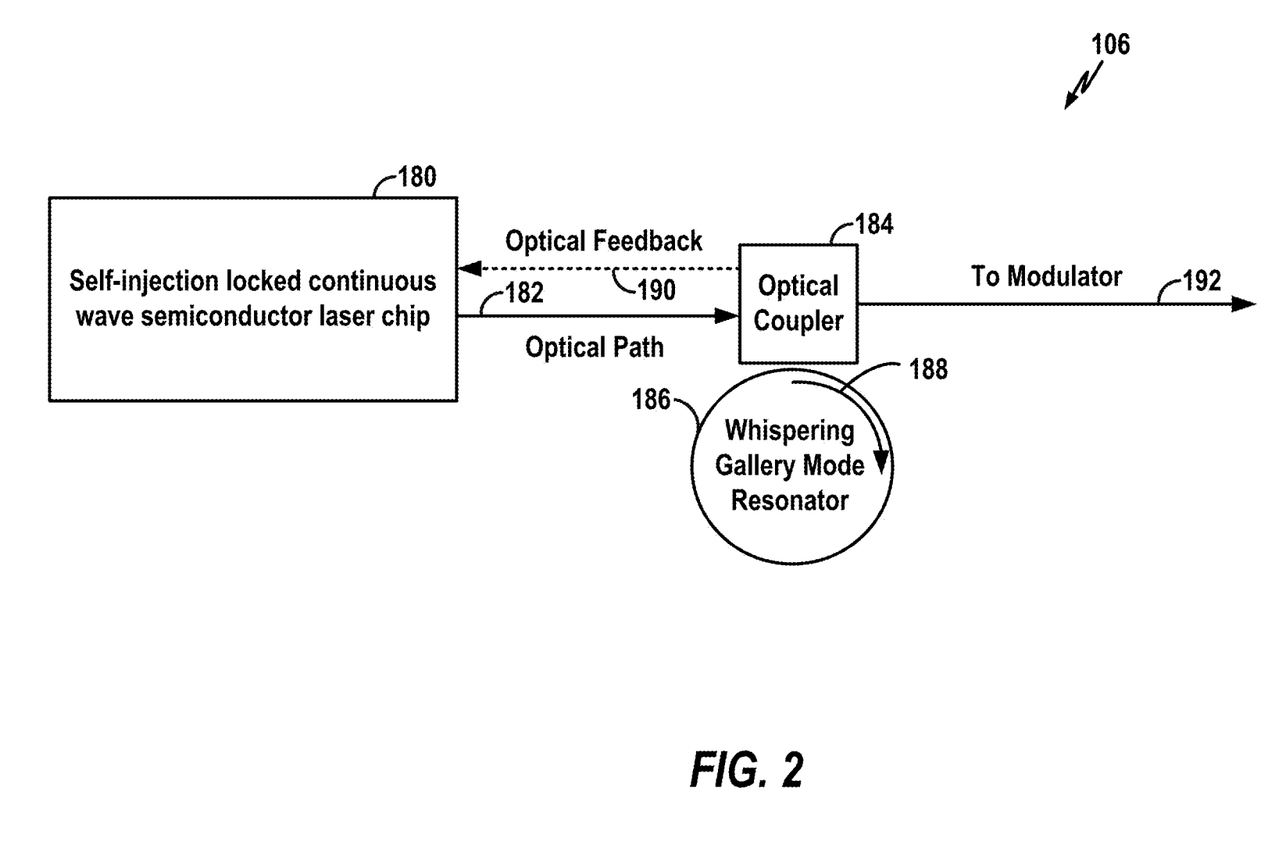
FIG. 2 is a block diagram of an exemplary coherent light source having a self-injection locked narrow linewidth continuous wave (CW) semiconductor laser chip.

FIG. 2 illustrates an exemplary implementation of coherent light source 106. Briefly, coherent light source 106 includes a continuous wave semiconductor laser chip 180 that outputs a narrow linewidth laser beam along an optical path 182 (which may be an optical waveguide) to an optical coupler 184. The optical coupler 184 feeds a portion of the laser beam into a WGM resonator 186 for propagation therein (as shown by arrow 188). A portion of the light propagating internally within the WGM 186 is fed back to the laser chip 180 via the optical coupler 184 along an optical feedback path 190 (which may be the same optical waveguide as path 182) for injection locking the laser. A portion of the laser beam is also output by the optical coupler along an optical path 192 (which may be another optical waveguide) to the first modulator 108 of FIG. 1. The second coherent light source 142 of FIG. 1 may be the same or similar to the first coherent light source 106. In some examples, the WGM of the first coherent light source 106 is mounted in close physical proximity to the WGM of the second coherent light source 142 on a single substrate so that they are affected substantially equally by any ambient perturbations to the substrate. (See, again, U.S. patent application Ser. No. 16/507,372, cited above.) However, this is not a requirement and the two coherent light sources and their components may be separate. In some examples, the Lidar device and the radar device are formed as an inhomogeneously integrated photonic chip, such as a device formed from various different materials (semiconductor, lithium niobate, etc.) on the same substrate. Also, note that FIG. 1 is just one example of a suitable laser. Other narrow linewidth continuous wave lasers with low noise produced by other types of locking using others types of resonators can alternatively be used.

Figure 3:
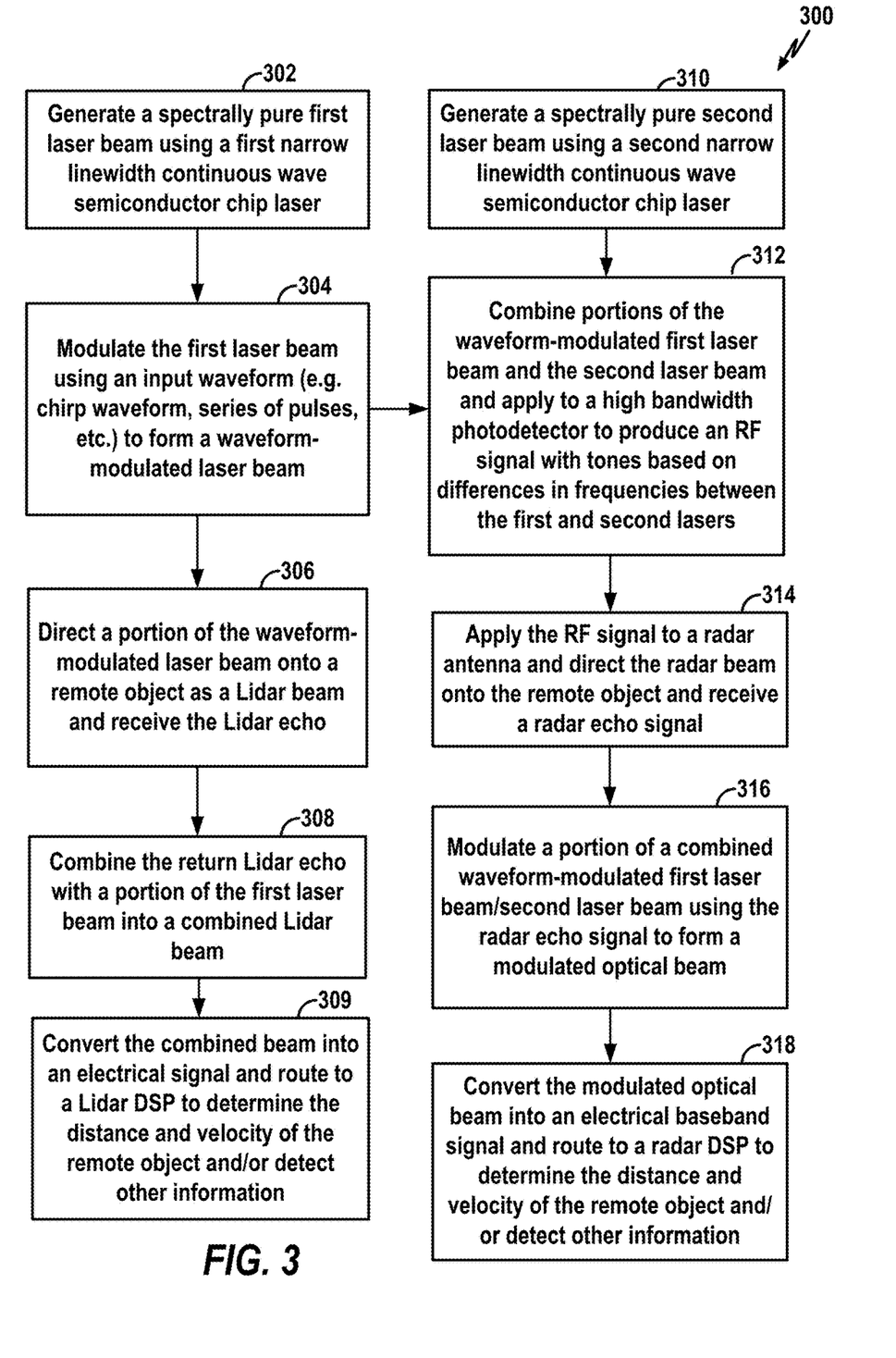
FIG. 3 is a flow chart of an exemplary method for dual Lidar and radar.

FIG. 3 summarizes a method 300 that may be employed using the apparatus FIG. 1 or other suitably-equipped systems, devices, or apparatus. At block 302, the dual Lidar/radar instrument generates a spectrally pure first continuous wave laser beam using a first narrow linewidth continuous wave semiconductor chip laser. At block 304, the instrument modulates the first laser beam using an input waveform (e.g. a chirp waveform or series of pulses, etc.) to form a waveform-modulated laser beam. At block 306, the instrument directs a portion of the waveform-modulated laser beam onto a remote object as a Lidar beam and receives the Lidar echo. At block 308, the instrument combines the return Lidar echo with a portion of the first laser beam into a combined Lidar beam. At block 309, the instrument converts the combined Lidar beam into an electrical signal and routes the electrical signal to a Lidar DSP to determine the distance and velocity of the remote object and/or detect other information. For example, depending upon the overall system, the DSP might be configured to determine the shape of the object or, depending upon the wavelengths used and other factors, the DSP might be configured to determine the surface texture of the object.

Concurrently, at block 310, the dual Lidar/radar instrument generates a spectrally pure continuous wave second laser beam using a second narrow linewidth continuous wave semiconductor chip laser. At block 312, the instrument combines portions of the waveform-modulated first laser beam and the second laser beam and applies the combined beam to a high bandwidth photodetector to produce an RF signal with tones based on differences in frequencies between the first and second lasers. At block 314, the instrument applies the RF signal to a radar antenna and directs the radar beam onto the remote object (or other object, if desired) and receives a radar echo signal. At block 316, the instrument modulates a portion of the combined waveform-modulated first laser beam/second laser beam using the radar echo signal to form a modulated optical beam. At block 318, the instrument converts the modulated optical beam into an electrical baseband signal and routes the electrical signal to a radar DSP to determine the distance and velocity of the remote object and/or detect other information.

FIG. 4 illustrates a configuration of a radar/Lidar dual sensor 400 wherein most of the components may be implemented on a chip. Although many of the features in FIG. 4 correspond with schematically-illustrated components of FIG. 1, there is no direct correspondence in all cases. Many of the features of FIG. 4 are shown functionally or schematically. Within a Lidar portion of the instrument, a first continuous wave laser 406 generates a coherent laser beam that is fed into a first modulator 408, which is modulated by a waveform generated by an off-chip waveform generator 410. Although not shown, a frequency controller may be provided to control the frequency of the first laser 406 and the frequency a second continuous wave laser 442, discussed below, and to set a frequency difference therebetween.

A wavelength-modulated beam output from modulator 408 is propagated along a waveguide 412 to a first optical reflector/splitter 414, which couples a first portion of the beam onto waveguide 416 and another portion along waveguide 421. The portion of the beam along waveguide 421 is fed into on-chip transmit optics 420, which outputs the beam as a Lidar output beam for reflecting off a remote object (not shown) of interest. A portion of Lidar output beam reflects off the remote object and is received as an input Lidar beam by on-chip receive optics 426, which routes the received Lidar beam along a waveguide 428 to a second optical reflector/splitter 430. Reflector/splitter 430 couples a portion of the input Lidar beam from waveguide 428 onto a waveguide 432 along with a portion of the beam received along waveguide 416 (i.e. waveform-modulated first laser beam) and feeds the combined beam into a low bandwidth PD 434, which generates an electrical signal along line 436 to an on-chip Lidar DSP 438. Note that in the figure, optical beams are indicated with open arrows, whereas electrical signals are indicated by solid arrows. The receive Lidar beam routed from the receiving optics 462 to the PD 434 is shown in dashed lines to distinguish it from other optical beams.

Reflector/splitter 430 also couples a portion of the beam along waveguide 416 (i.e. waveform-modulated first laser beam) onto a waveguide 445 to feed into the radar portion of the instrument. (Note that depending on how component 430 is configured, the beam along waveguide 445 might also include a small portion of the return Lidar beam from the receive optics 426, but this portion can be kept small by configuring component 430 to minimize the "reflection" of the Lidar beam onto waveguide 445.) The beam along waveguide 445 is propagated into a reflector/splitter 440 that couples a portion of that beam (i.e. the waveform-modulated first laser beam) onto a waveguide 448 along with a portion of a second laser beam generated by a second laser 442 along waveguide 444. Hence, waveguide 448 carries a combined beam that includes the waveform-modulated first laser beam and the second laser beam, which is applied to a high bandwidth PD 450.

As already explained, by selecting and controlling the frequency difference between the first and second continuous wave lasers, the beam applied to the high bandwidth PD of the instrument beats to provide an RF tone for use in generating a radar beam. PD 450 converts the combined (beating) optical beam it receives along waveguide 448 into an RF electrical signal along line 454 for applying as a radar output signal to transmit a radar beam to the same (or a different) remote object. A return echo radar signal received by antenna 458 is applied via a line 460 to a modulator 452. (Note, although not shown in the figures, the radar out signal can be applied to the antenna 458 so that in some examples, the antenna 458 serves as both an input and output radar antenna.)

The reflector/splitter 440 also directs a portion of the second laser beam from waveguide 444 into waveguide 446, which also receives a portion of the waveform-modulated first laser beam from waveguide 445. The modulator 452 modulates that combined beam to generate the above-described base band output beam, which is output along a waveguide 462 to a low bandwidth PD 464. PD 464 generates a responsive electrical signal for applying along line 466 to an on-chip radar DSP 468.

Figure 5:
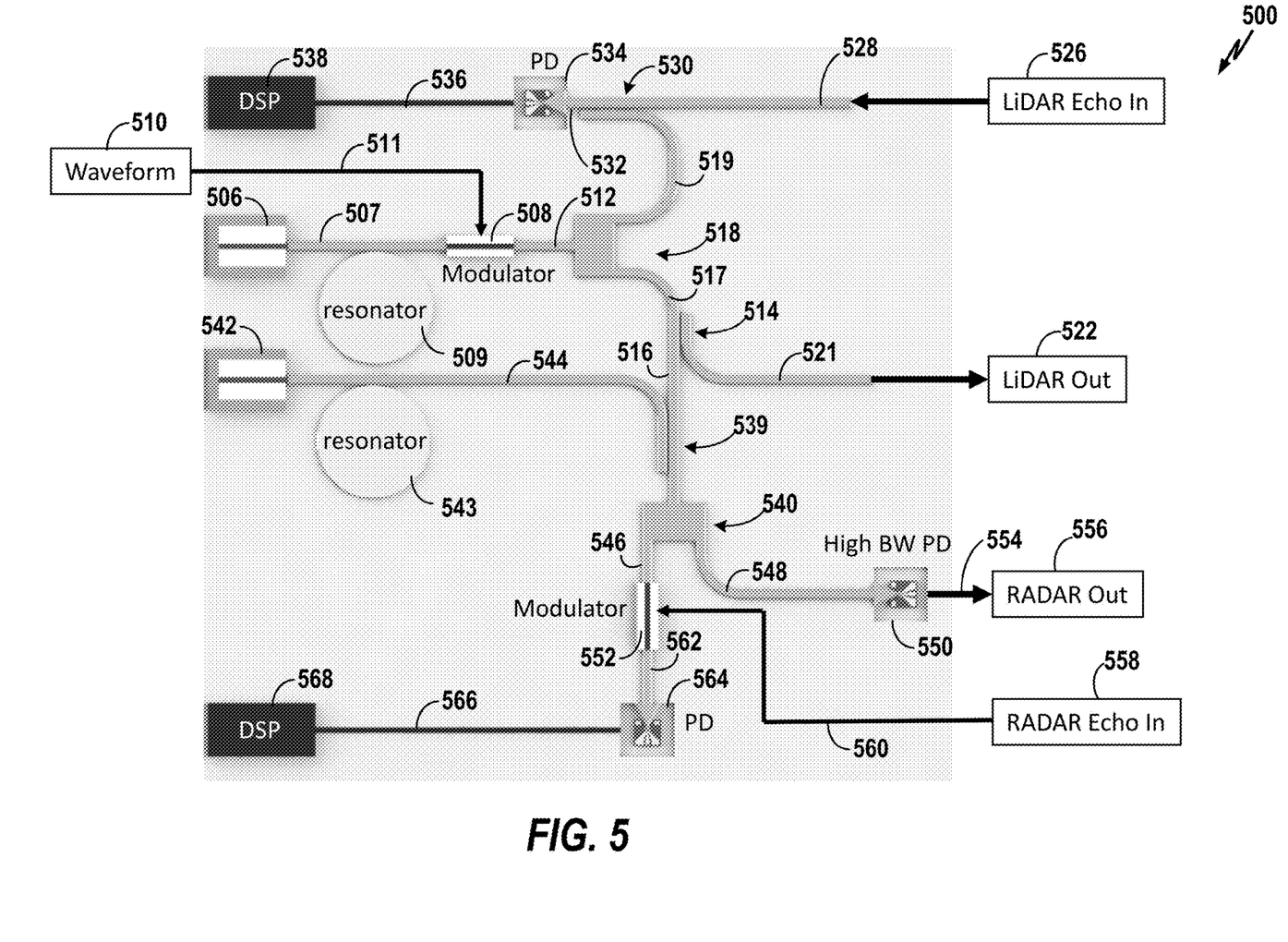
FIG. 5 illustrates another exemplary ship configuration for a dual Lidar/radar instrument.

FIG. 5 illustrates another configuration of a radar/Lidar dual sensor wherein most of the components may be implemented as a PIC. Although many of the features in FIG. 5 correspond with schematically-illustrated components of FIG. 1, there is no direct correspondence in all cases. Within a Lidar portion of the instrument, a first continuous wave laser 506 generates a coherent laser beam that is fed along a waveguide 507 into a first modulator 508, which is modulated by a waveform generated by an off-chip waveform generator 510 and received along an electrical signal control line 511. Note that FIG. 5 also illustrates a resonator 509 coupled to the waveguide 507, which may be, e.g., a WGM resonator of the type shown in FIG. 2. Although not shown, a frequency controller may be provided to control the frequency of the first continuous wave laser 506 and the frequency a second continuous wave laser 542, discussed below, and to set a frequency difference there-between.

A wavelength-modulated beam output from modulator 508 is propagated along a waveguide 512 to a first optical reflector/splitter 518, which couples a first portion of the beam onto waveguide 517 and another portion along waveguide 519. The portion of the beam along waveguide 517 passes through a splitter 514, which splits off a portion of the beam onto a waveguide 521 as a Lidar output signal 522 that feeds into off-chip transmit optics (not shown), which, in turn, outputs the beam as a Lidar output beam for reflecting off a remote object, also not shown. A portion of Lidar output beam reflects off the remote object and is received as an input Lidar beam 526 by off-chip receive optics, not shown, which routes the received Lidar beam along a waveguide 528 to an optical combiner component 530, which merges the received Lidar beam with the waveform-modulated beam propagating along waveguide 519. A continuing portion of waveguide 528 (identified by reference numeral 532) feeds the combined beam into a low bandwidth PD 534, which generates an electrical signal along signal line 536 to an on-chip Lidar DSP 538 for Lidar processing.

Splitter 514 also splits a portion of the waveform-modulated beam from waveguide 517 onto waveguide 516 (which may be a continuation of waveguide 517) to feed into the radar portion of the instrument. A second continuous wave laser beam is generated by a second laser 542 and fed along waveguide 544. A resonator 543 for use with the second laser 542 is shown. The second laser beam along waveguide 544 is merged with the waveform-modulated beam to form a combined beam and applied to a splitter/reflector 540, which splits the combined beam into two portions, one portion of which is fed along waveguide 548 to a high bandwidth PD 550. Hence, waveguide 548 carries a combined beam that includes the waveform-modulated first laser beam and the second laser beam. As already explained, by selecting and controlling the frequency difference between the first and second lasers, the beam applied to the high bandwidth PD of the instrument beats to provide an RF tone for use in generating a radar beam. PD 550 converts the combined (beating) optical beam it receives along waveguide 548 into an RF electrical signal along line 554 for applying as a radar output signal 556 to transmit a radar beam to the same (or a different) remote object using an off-chip antenna, not shown. A return echo radar signal 558 is applied via a line 560 to a modulator 552 for use as the modulating signal.

The reflector/splitter 540 also directs a portion of the combined laser beam along waveguide 546 to the modulator 552. The modulator 552 modulates that combined beam to generate the above-described base band output beam, which is output along a waveguide 562 to a low bandwidth PD 564. PD 564 generates a responsive electrical signal for applying along line 566 to an on-chip radar DSP 568.

Figure 6:
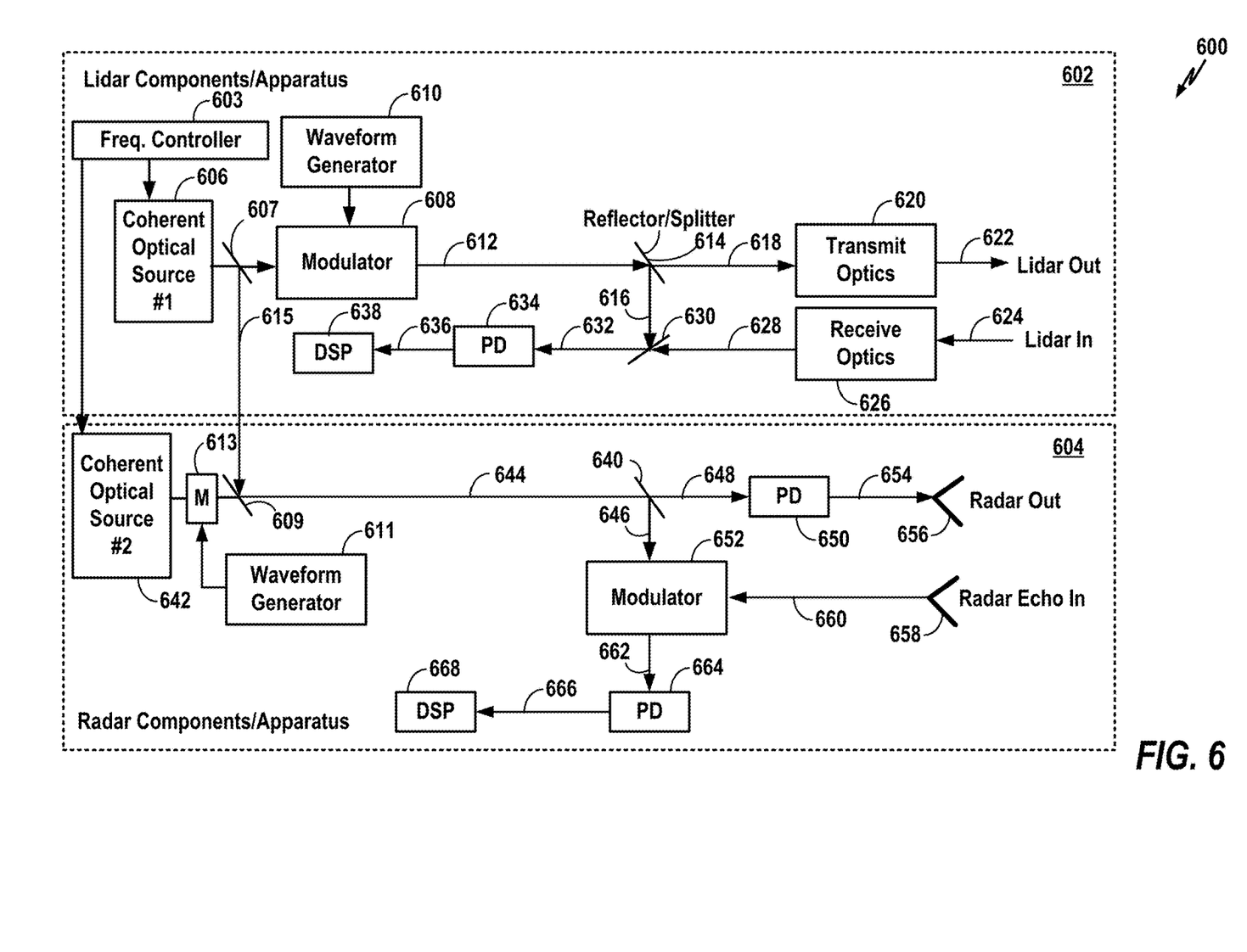
FIG. 6 is a block diagram of another exemplary dual Lidar/radar instrument.

FIG. 6 is a block diagram of an alternative dual Lidar/radar instrument 600, which, as compared to the instruments of FIGS. 1, 4 and 5, additionally includes a waveform generator and modulator for waveform modulating the second laser. The Lidar apparatus or portion 600 includes a first coherent light source 606 that generates a coherent continuous wave laser beam that is applied to a splitter/reflector 607, which passes a portion of the laser beam to a first modulator 608 while splitting off a second portion of the laser along an optical path 615 to the radar portion of the apparatus 604 (to be discussed below). The first modulator 608, which is modulated by a waveform generated by a waveform generator 610. The laser 606 may be a spectrally pure narrow linewidth continuous wave laser that includes a WGM resonator or other suitable resonator for locking the wavelength of the laser to a precise wavelength. The frequency of the first coherent light source 606 may be set or controlled by a frequency controller 603. The wavelength-modulated output beam 612 from modulator 608 is applied to a first reflector/splitter 614, which reflects (splits) a first portion of beam 612 onto path 616 while passing a second portion of beam 612 along path 618. The portion of the beam along path 618 is fed into transmit optics 620, which outputs the beam as a Lidar output beam 622 for reflecting off a remote object (not shown) of interest.

A portion of beam 612 reflects off the remote object and is received as an input Lidar beam 624 by receive optics 626. The receive optics 626 routes the received Lidar beam along a path 628 to a second reflector/splitter 630, which passes the receive Lidar beam along path 632 while passing reflecting the beam of path 616 onto path 632 and applied to a PD 634. The PD 634 generates an electrical signal along line 636 that is applied to a DSP 638, which is configured for Lidar processing.

The radar portion 604 of the instrument 600 includes a second coherent light source 642 (e.g. a second continuous wave semiconductor laser) that generates a second spectrally pure narrow linewidth coherent laser beam that is applied to a modulator 613 that receives a waveform from a waveform generator 611 (which may be a different waveform that the one generated by waveform generator 610 of the Lidar apparatus). The frequency of the second coherent light source 642 may be set or controlled by the frequency controller 607. The output of the modulator 613 is combined with the beam received along optical path 615 via a reflector/splitter 609 onto an optical path 644 and then applied to a reflector/splitter 640. The reflector/splitter 640 reflects (splits) a first portion of the beam 644 onto an optical path 646 while passing a second portion of the beam along a path 648 to a high BW PD 650.

The high BW PD 650 generates an RF output signals along line 654 (based on beating between the first and second continuous wave laser beams, as already explained), which is applied to radar out components 656. The frequency of the beat can be set by the frequency controller 607, which controls the difference in frequency between the two coherent light sources. The radar out components 656 transmit an output radar beam toward the same remote object that is scanned by the Lidar output beam (or a different object, if desired). A radar echo input signal is received by radar input components 658. The radar echo signal is applied along a line 660 to a modulator 652 that also receives the beam along path optical 646 and is used to modulate the optical signal along path 646. The radar-modulated optical beam output from modulator 652 is fed along a path 662 to a third PD 664, which generates an electrical baseband signal along line 666 for application to a radar DSP 668.

In the descriptions above, the details of the transmit/receive subsystems hardware for both the Lidar and the radar have been omitted since particular applications can incorporate the output of the Lidar and radar depicted in the figures to a transmit/receive subsystem suitable for the particular application. For example, there may be a single transmit/receive subsystem, or one for transmit and one for receive, in each Lidar and radar use cases. Note that these subsystems could be separated via a fiber from the dual architectures shown in the figures to a remote location. In that case, the high bandwidth PD for radar may be mounted at the end of the fiber at the remote location. Also note that in the case of the PIC, the outputs can be provided off chip, or if the antennas are implemented on the same chip, the output can be on chip to those elements.

Further Exemplary Systems, Methods and Apparatus

Figure 7:
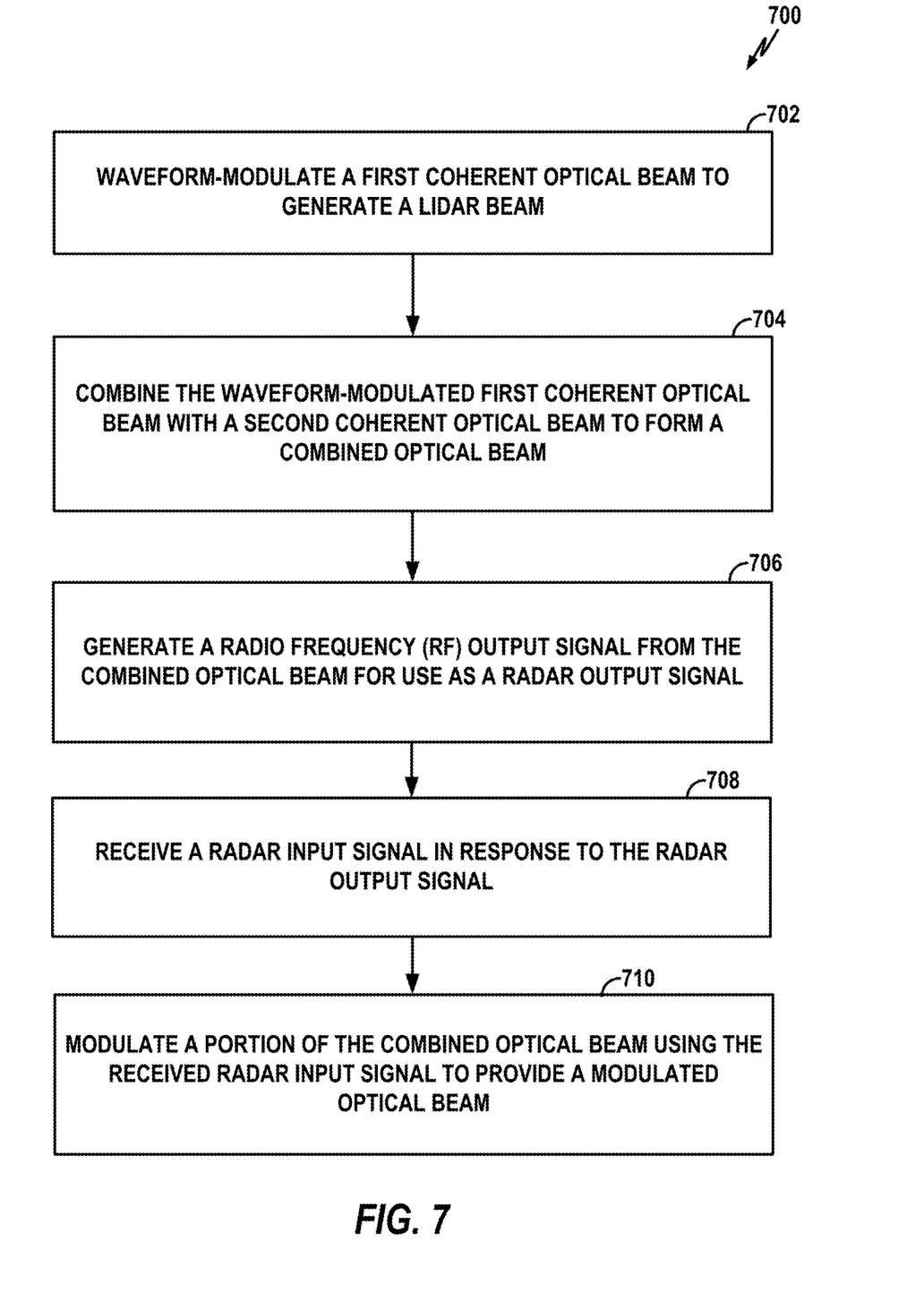
FIG. 7 is a flow chart of another exemplary method disclosed herein.

FIG. 7 broadly summarizes a method 700 in accordance with aspects disclosed herein. Briefly, at block 702, an apparatus waveform-modulates a first coherent optical beam to generate a Lidar beam. In some examples, the Lidar beam is output to optical transmission components for transmitting to a remote object and optical reception components are provided for receiving a Lidar reflection signal. In some examples, the received Lidar reflection signal is combined with the waveform-modulated beam and applied to a photodetector to generate an electrical signal for Lidar DSP processing to, for example, determine the distance and velocity of the remote object, or other parameters.

At block 704, the apparatus combines the waveform-modulated first coherent optical beam with a second coherent optical beam to form a combined optical beam. At block 706, the apparatus generates an RF output signal from the combined optical beam for use as a radar output signal. In some examples, this is achieved by controlling a frequency difference between the first and second coherent optical beams to cause a beating pattern or tone in the combined beam, which is applied to a high bandwidth photodetector to generate a radar output signal at the frequency or tone of the beating pattern. In some examples, the radar output signal is output to radar transmission components (e.g. an antenna) for transmitting to the same or a different remote object.

At block 708, the apparatus receives a radar input signal in response to the radar output signal. In some examples, the radar input signal is a radar echo signal received using radar reception components (e.g. the same or a different antenna). At block 710, the apparatus modulates a portion of the combined optical beam using the radar input signal to provide a modulated optical beam. In some examples, the modulated optical beam is applied to a photodetector to generate an electrical baseband signal for radar DSP processing to, for example, determine the distance and velocity of the remote object, or other parameters, using radar rather than Lidar.

Figure 8:
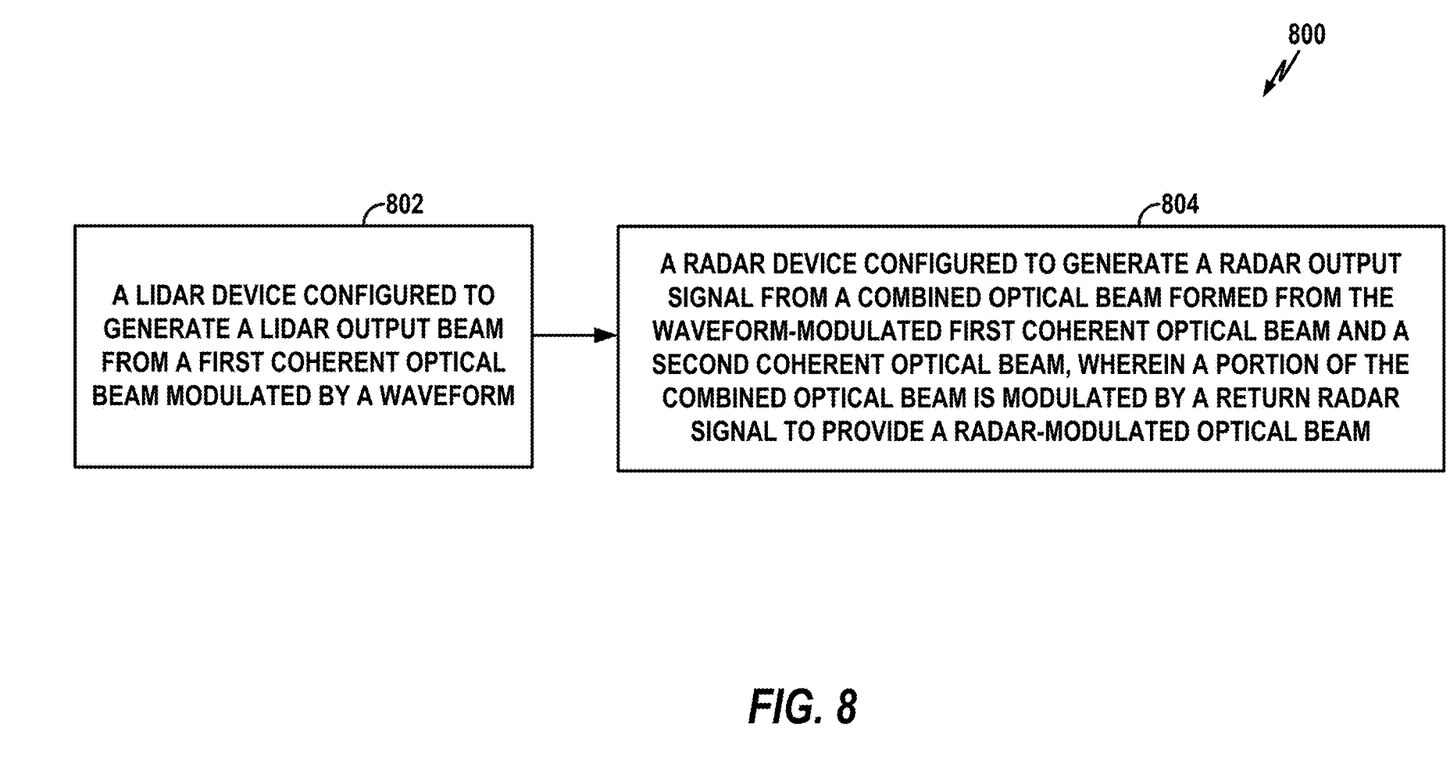
FIG. 8 is a block diagram of another exemplary system, device or apparatus disclosed herein.

FIG. 8 broadly summarizes an apparatus 800 in accordance with aspects disclosed herein. Briefly, the apparatus 800 includes a Lidar device 802 (or system, apparatus, instrument, or the like) configured to generate a Lidar output beam from a first coherent optical beam modulated by a waveform. The apparatus 800 also includes a radar device 804 (or system, apparatus, instrument, or the like) configured to generate a radar output signal from a combined optical beam formed from the waveform-modulated first coherent optical beam and a second coherent optical beam, wherein a portion of the combined optical beam is modulated by a return radar signal to provide a radar-modulated optical beam. Lidar device 802 and the radar device 804 may be photonic devices.

In some aspects, various means may be provided for performing the functions described herein. For example, an apparatus may be provided with: means for waveform-modulating a first coherent optical beam to generate a Lidar beam; means for combining the waveform-modulated first coherent optical beam with a second coherent optical beam to form a combined optical beam; means for generating a radio frequency (RF) output signal from the combined optical beam for use as a radar output signal; means for receiving a radar input signal in response to the radar output signal; and means for modulating a portion of the combined optical beam using the radar input signal to provide a modulated optical beam.

Additional Aspects and Considerations

Note that one or more of the components, steps, features, and/or functions illustrated in FIGS. 1, 2, 3, 4, 5, 6, 7, and/or 8 may be rearranged and/or combined into a single component, step, feature or function or embodied in several components, steps, or functions. Additional elements, components, steps, and/or functions may also be added without departing from the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, an aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects. Elements or aspects from an aspect can be combined with elements or aspects of another aspect.

The term "coupled" may mean that two or more elements are in direct physical or electrical contact. However, "coupled" may also mean that two or more elements are not in direct contact with each other, but yet still co-operate or interact with each other.

Not all components, features, structures, characteristics, etc. described and illustrated herein need be included in a particular aspect or aspects. If the specification states a component, feature, structure, or characteristic "may," "might," "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although some aspects have been described in reference to particular implementations, other implementations are possible. Additionally, the arrangement and/or order of elements or other features illustrated in the drawings and/or described herein need not be arranged in the particular way illustrated and described. Many other arrangements are possible according to some aspects.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus, comprising:
a Lidar device configured to generate a Lidar output beam from a first coherent optical beam modulated by a waveform; and
a radar device configured to generate a radar output signal from a combined optical beam formed from the waveform-modulated first coherent optical beam and a second coherent optical beam, wherein a portion of the combined optical beam is modulated by a return radar signal to provide a radar-modulated optical beam;
wherein the Lidar device comprises a first continuous wave coherent optical source configured to produce the first coherent optical beam at a first frequency; and
wherein the radar device comprises
a second continuous wave coherent optical source configured to produce the second coherent optical beam at a second frequency, and
an optical combiner configured to combine portions of the waveform-modulated first coherent optical beam and the second coherent optical beam to form the combined optical beam to have a selected beat frequency at any frequency determined by a frequency difference between the first and second continuous wave coherent optical beams so that the radar device generates the radar output signal at any selected radio frequency based on the selected beat frequency of the combined optical beam.

2. The apparatus of claim 1, wherein the Lidar device further comprises:
a first modulator configured to modulate the first coherent optical beam using the waveform;
a Lidar output component configured to output a first portion of the waveform-modulated first coherent optical beam to transmit optics for transmission to a remote object;
a Lidar input component configured to input a reflected optical beam received by receive optics;
a first optical beam combiner configured to combine a second portion of the waveform-modulated first coherent optical beam with the received reflected optical beam to form a combined Lidar beam; and
a first photodetector configured to generate a first electrical output signal from the combined Lidar beam for Lidar signal analysis.

3. The apparatus of claim 2, further comprising a first digital signal processor (DSP) configured to signal process the first electrical output signal from the first photodetector.

4. The apparatus of claim 2, wherein the Lidar device further comprises one or both of the transmit optics and the receive optics.

5. The apparatus of claim 1, wherein the first coherent optical source comprises a continuous wave self-injection laser.

6. The apparatus of claim 5, wherein the continuous wave laser is optically coupled to a whispering gallery mode (WGM) resonator.

7. The apparatus of claim 1, further comprising a waveform generator for generating the waveform.

8. The apparatus of claim 1, further comprising a first optical splitter configured to split the waveform-modulated first coherent optical beam into a first portion for use in generating the Lidar output beam and a second portion for feeding into the radar device for combining with the second coherent optical beam to form the combined optical beam.

9. The apparatus of claim 8, wherein the radar device further comprises:
    a radio frequency (RF) signal output component configured to output an RF signal derived from the combined optical beam to radar transmission components for transmitting as the radar output signal to the same or a different remote object;
    an RF signal input component configured to input an RF signal derived from the return radar signal detected by radar reception components;
    a second modulator configured to modulate the combined optical beam using the received RF signal to form an RF-modulated optical beam; and
    a second photodetector configured to generate a second electrical output signal from the RF-modulated optical beam for radar signal analysis.

10. The apparatus of claim 9, further comprising a second digital signal processor (DSP) configured to signal process the second electrical output signal to determine distance and/or velocity of a remote object via the radar signal analysis.

11. The apparatus of claim 9, wherein the radar device further comprises one or both of the radar transmission and radar reception components.

12. The apparatus of claim 9, wherein the second coherent optical source comprises a continuous wave self-injection laser.

13. The apparatus of claim 9, wherein the radar device further comprises:
    a third photodetector configured to convert the combined optical beam into the RF signal for outputting to the radar transmission components.

14. The apparatus of claim 1, further comprising a controller configured to control the frequency difference between the first and second coherent optical beams so that the combined optical beam has the selected beat frequency.

15. The apparatus of claim 14, wherein the first and second coherent optical sources are lasers configured to provide first and second laser beams having the frequency difference, and wherein the controller is configured to control the frequency difference to cause the combined optical beam to form an optical beating pattern having the selected beat frequency for use in generating the radar output signal.

16. The apparatus of claim 1, wherein the Lidar device and the radar device, including all their components, are formed as a photonic integrated circuit (PIC) on a single substrate.

17. The apparatus of claim 16, wherein the first and second optical coherent sources are affected substantially equally by any ambient perturbations to the single substrate.

18. The apparatus of claim 1, wherein the Lidar device and the radar device are formed as an inhomogeneously integrated photonic chip.

19. The apparatus of claim 1, wherein the first coherent optical source comprises a first laser, the second coherent optical source comprises a second laser, and the apparatus further comprises a device configured to vary a wavelength of the first and second lasers to achieve the selected radar frequency of the radar output signal.

20. The apparatus of claim 1, wherein at least some electronic components of one or both of the Lidar device and the radar device are formed on a chip.

21. The apparatus of claim 20, wherein the at least some electronic components formed on the chip comprise electronic devices for one or more of generating the first and second coherent optical beams, modulating the first and second coherent optical beams, outputting the Lidar output beam, inputting a reflected Lidar beam, and signal processing one or more signals.

22. A method, comprising:
    waveform modulating a first continuous wave coherent optical beam at a first frequency to generate a Lidar beam;
    combining the waveform-modulated first coherent optical beam at the first frequency with a second continuous wave coherent optical beam at a second frequency to form a combined optical beam having a selected beat frequency at any frequency determined by a frequency difference between the first and second continuous wave coherent optical beams;
    generating a radio frequency (RF) output signal from the combined optical beam for use as a radar output signal having any selected radio frequency based on the selected beat frequency of the combined optical beam;
    receiving a radar input signal in response to the radar output signal; and
    modulating a portion of the combined optical beam using the radar input signal to provide a radar-modulated optical beam.

23. The method of claim 22, wherein the first coherent optical beam is waveform-modulated using a first waveform, and wherein the method further comprises waveform modulating the second coherent optical beam with a second waveform before the second coherent optical beam is combined with the waveform-modulated first coherent optical beam.

24. An apparatus, comprising:
    means for waveform modulating a first continuous wave coherent optical beam at a first frequency to generate a Lidar beam;
    means for combining the waveform-modulated first coherent optical beam at the first frequency with a second coherent optical beam at a second frequency to form a combined optical beam having a selected beat frequency at any frequency determined by a frequency difference between the first and second continuous wave coherent optical beams;
    means for generating a radio frequency (RF) output signal from the combined optical beam for use as a radar output signal having any selected radio frequency based on the selected beat frequency of the combined optical beam;
    means for receiving a radar input signal in response to the radar output signal; and
    means for modulating a portion of the combined optical beam using the radar input signal to provide a radar-modulated optical beam.

25. An apparatus, comprising:

a first continuous wave laser configured to produce a first continuous wave coherent optical beam at a first frequency;

a second continuous wave laser configured to produce a second continuous wave coherent optical beam at a second frequency, wherein laser emissions of the second laser are continuously tunable;

a Lidar device configured to modulate the first continuous wave coherent optical beam using a waveform and to generate a Lidar output beam from the waveform-modulated first continuous wave coherent optical beam;

a combining device configured to combine the waveform-modulated first continuous wave coherent optical beam and the second continuous wave coherent optical beam to form a continuously tunable combined optical beam;

a radar device configured to derive a continuously tunable radar output signal from the continuously tunable combined optical beam, wherein a portion of the combined optical beam is modulated by a continuous wave return radar signal to provide a radar-modulated continuous wave optical beam;

a frequency controller configured to control a frequency difference between the first and second continuous wave coherent optical beams; and wherein the Lidar device is further configured to determine distance and/or velocity of a remote object via Lidar processing of the waveform-modulated first continuous wave coherent optical beam, and wherein the radar device is further configured to determine distance and/or velocity of the same remote object via radar processing of the radar-modulated optical beam.

* * * * *